(12) United States Patent
Peterson et al.

(10) Patent No.: US 7,048,139 B1
(45) Date of Patent: May 23, 2006

(54) CORROSION RESISTANT VENTS WITH INTEGRAL FILTER

(75) Inventors: Michael D. Peterson, Parker, CO (US); Terry J. Wickland, Evergreen, CO (US)

(73) Assignee: Nuclear Filter Technology, Inc., Golden, CO (US)

( * ) Notice: Subject to any disclaimer, the term of this patent is extended or adjusted under 35 U.S.C. 154(b) by 858 days.

(21) Appl. No.: 09/658,374

(22) Filed: Sep. 8, 2000

(51) Int. Cl.
*B65D 51/16* (2006.01)
*B01D 39/00* (2006.01)
*B01D 46/30* (2006.01)
*B01D 59/26* (2006.01)

(52) U.S. Cl. .................. 220/371; 220/367.1; 220/360; 220/304; 55/523; 95/274; 96/147

(58) Field of Classification Search .................. 55/523; 95/55, 273, 274; 96/4, 147; 210/436, 472; 215/308, 309, 355, 356, 364, 350; 220/367.1, 220/371, 372, 373, 304, 254.1, 254.8, 203.01, 220/203.03, 203.02, 203.13, 203.29, 202, 220/255, 601, 360, 359.5, DIG. 19

See application file for complete search history.

(56) References Cited

U.S. PATENT DOCUMENTS

| | | | | |
|---|---|---|---|---|
| 2,650,673 A | * | 9/1953 | Bering et al. ................ | 220/371 |
| 4,231,488 A | * | 11/1980 | Ward et al. .................. | 219/121 |
| 4,366,971 A | * | 1/1983 | Lula ............................. | 285/55 |
| 4,500,328 A | | 2/1985 | Brassell et al. | |
| 4,996,369 A | * | 2/1991 | Kalota et al. ................ | 568/615 |
| 5,140,165 A | * | 8/1992 | Kiuchi et al. ................ | 220/373 |
| 5,249,593 A | * | 10/1993 | Higgins et al. ................ | 137/12 |
| 5,353,949 A | * | 10/1994 | Seibert et al. ............... | 220/304 |
| 5,397,652 A | * | 3/1995 | Carey et al. ................. | 428/610 |
| 5,686,700 A | * | 11/1997 | Carpinella ................. | 174/65 R |
| 5,727,707 A | | 3/1998 | Wickland et al. | |
| 5,839,593 A | * | 11/1998 | McKedy ..................... | 215/349 |
| 5,911,332 A | | 6/1999 | Wickland et al. | |
| 5,988,414 A | * | 11/1999 | Schwarz et al. ............. | 215/308 |
| 6,041,669 A | * | 3/2000 | Brassell et al. .......... | 73/864.74 |
| 6,089,399 A | * | 7/2000 | Felbaum et al. ............. | 220/582 |
| 6,095,356 A | * | 8/2000 | Rits ........................... | 215/308 |
| 6,139,931 A | * | 10/2000 | Finkelstein et al. ........ | 428/36.6 |
| 6,305,568 B1 | * | 10/2001 | Suzuki et al. ................ | 220/601 |
| 6,395,050 B1 | * | 5/2002 | Wickland et al. .......... | 55/385.4 |
| 6,413,304 B1 | * | 7/2002 | Wickland et al. ............. | 96/147 |

* cited by examiner

*Primary Examiner*—Robin A Hylton
(74) *Attorney, Agent, or Firm*—Millen, White, Zelano & Branigan, P.C.

(57) ABSTRACT

A vent insert with an integral carbon-to-carbon composite filter element is used to vent enclosures such as drums and convenience cans containing transuranic materials which generate hydrogen. The vent inserts do not utilize adhesive to retain filter elements therein but rather utilize a housing having a filter element support with a knife edge to form a seal and a press fitted lid. Both the housing and lid are formed of corrosion resistant HASTELLOY® C-22® alloy. The vent inserts resist HCl corrosion as well as corrosion induced by nitric acid and chlorinated solvents.

19 Claims, 3 Drawing Sheets

| Media | Concentration, % by weight | Test Temperature °F (°C) | Average Corrosion Rate per year, mils** | | | |
|---|---|---|---|---|---|---|
| | | | C-22® alloy | C-276 alloy | C-4 alloy | 625 alloy |
| Acetic Acid | 99 | Boiling | Nil | <1 | Nil | <1 |
| Ferric Chloride | 10 | Boiling | 1 | 2 | 140 | 7325 |
| Formic Acid | 88 | Boiling | <1 | 1 | 2 | 9 |
| Hydrochloric Acid | 1 | Boiling | 3 | 13 | 25 | 1 |
| | 1.5 | Boiling | 14 | 32 | 64 | 353 |
| | 2 | 194 (90) | Nil | 1 | 31 | Nil |
| | 2 | Boiling | 61 | 51 | 82 | 557 |
| | 2.5 | 194 (90) | <1 | 12 | 34 | 72 |
| | 2.5 | Boiling | 141 | 85 | 44 | 605 |
| | 10 | Boiling | 400 | 288 | 228 | 642 |
| Hydrochloric Acid +42 g/l Fe2(SO4)3 | 1 | 200 (93) | 2 | 41 | — | 238 |
| | 5 | 150 (66) | 2 | 5 | 3 | 2 |
| Hydrochloric Acid +2% HF | 5 | 158 (70) | 59 | 26 | 34 | 123 |
| Hydrofluoric Acid | 2 | 158 (70) | 9 | 9 | 17 | 20 |
| | 5 | 158 (70) | 14 | 10 | 15 | 16 |
| P2O5 (Commercial Grade) | 38 | 185 (85) | 2 | 9 | — | 1 |
| | 44 | 240 (116) | 21 | 100 | — | 23 |
| | 52 | 240 (116) | 11 | 33 | — | 12 |
| P2O5+ 2000 ppm Cl | 38 | 185 (85) | 1 | 12 | — | 2 |
| P2O5+ 0.5% HF | 38 | 185 (85) | 7 | 45 | — | 9 |
| Nitric Acid | 10 | Boiling | <1 | 7 | 7 | <1 |
| | 65 | Boiling | 134 | 888 | 217 | 21 |
| Nitric Acid+ 6% HF | 5 | 140 (60) | 67 | 207 | 204 | 73 |
| Nitric Acid+ 25% H2SO4+ 4% NaCl | 5 | Boiling | 12 | 64 | 97 | 713 |
| Nitric Acid+ 1% HCl | 5 | Boiling | <1 | 8 | 11 | 1 |
| Nitric Acid+ 2.5% HCl | 5 | Boiling | 2 | 21 | 26 | <1 |
| Nitric Acid+ 15.8% HCl | 8.8 | 126 (52) | 4 | 33 | 114 | >10,000 |

*Average of 4-10 tests.
**To convert mils per year (mpy) to mm per year, divide by 40.

FIG. 5

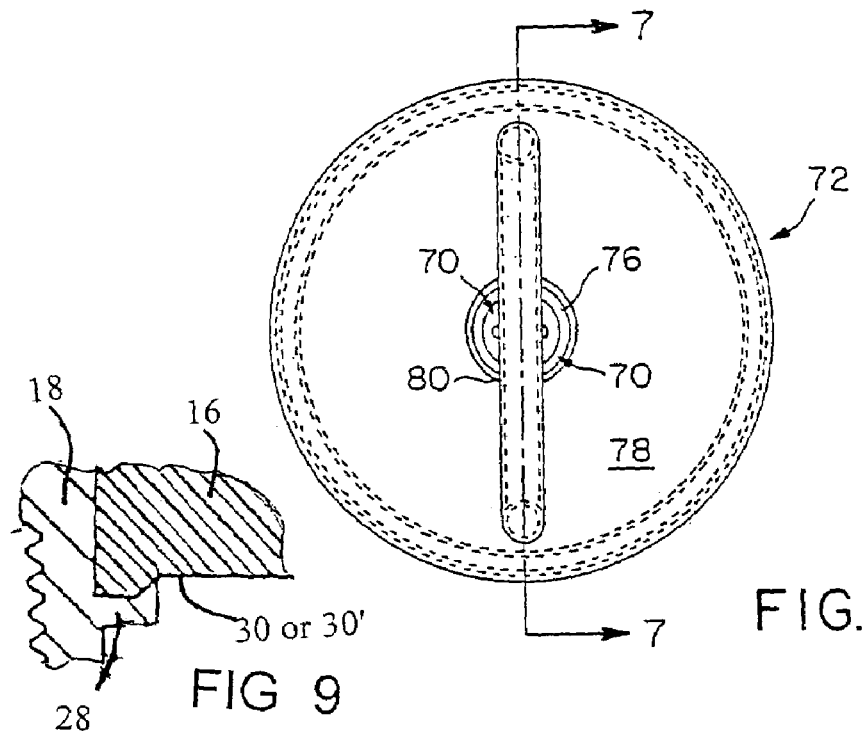
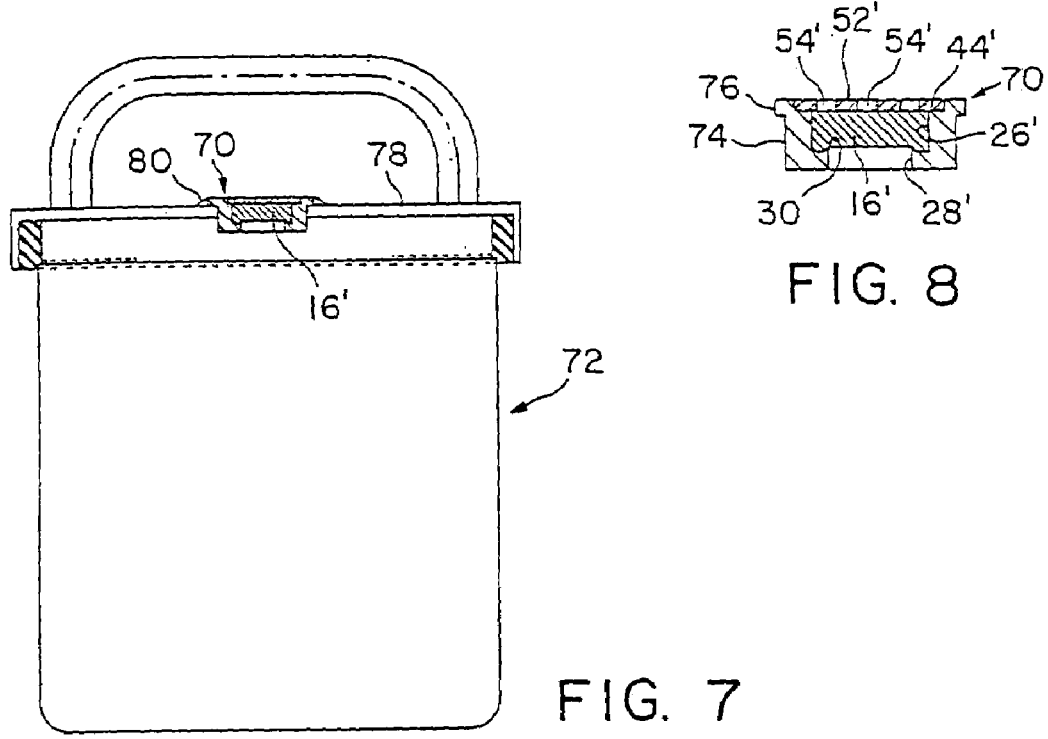
FIG. 6
FIG. 9
FIG. 8
FIG. 7

US 7,048,139 B1

CORROSION RESISTANT VENTS WITH INTEGRAL FILTER

FIELD OF THE INVENTION

The present invention relates to vents with integral filters and more particularly, the present invention relates to vents with integral filters which are corrosion resistant.

BACKGROUND OF THE INVENTION

When storing hazardous materials in enclosures such as drums, convenience cans or even rooms, it is frequently necessary to vent gasses from the enclosures in order to avoid hazardous situations. Exemplary of gasses which should be vented from enclosures are hydrogen gas, and volatile organic compounds which can result in explosions if not vented. Of particular concern are transuranic materials which contain or generate hydrogen gas. There is a risk if hydrogen gas is not allowed to exit from a container that the gas will cause an explosion within the container dispersing radioactive materials into the surrounding environment.

Nuclear storage enclosures must be able to store a nuclear waste material for thousands of years without rupturing or leaking. Accordingly, venting hydrogen gas and volatile organic compounds is necessary for at least the initial portion of the storage period. Transuranic material frequently includes corrosive agents such as hydrochloric acid, nitric acid, 1,1,TCE and carbon tetrachloride which, over time, tend to corrode materials such as stainless steel used for drums and convenience cans. This is especially the case at locations within drums such as vents where stainless steel interfaces with filter media and fluid materials are flowing. More particularly, it is necessary to control VOC release and ventilation of hydrogen gas generated in 55-gallon drums, overpacked drums, and standard waste boxes containing TRU, low level hazardous or mixed wastes that contain chlorinated solvents, hydraulic acid or nitric acid.

Tests have indicated that the prior art filters such as sintered metal filters become plugged when HCl/CCl$_4$ is bubbled therethrough so as to not permit passage of hydrogen gas. It was further found that 316 stainless steel housings with epoxy sealant and a carbon composite filter resulted in the epoxy becoming gooey due to reaction with solvents. It was further found that a mechanical press fit seal of a carbon-to-carbon composite filter in a 316 stainless steel housing passed compatibility tests with nitric acid, CCl$_4$ and TCE with no change in filtration performance, however, this arrangement is not compatible with HCl because exposure to HCl results in the filter media becoming plugged with a corrosion residue that is moist with condensed acid fumes. Isolated carbon-to-carbon filter media exhibited no plugging when tested in the absence of adjacent stainless steel structure.

SUMMARY OF THE INVENTION

The present invention is directed to an enclosure vent adapted to vent hydrogen gas while controlling release of volatile organic compounds from an enclosure into an environment surrounding the enclosure, the vent having a filter element and being resistant to erosion from corrosive materials including chlorinated solvents, hydrochloric acid and nitric acid. The enclosure vent comprises a housing defining a chamber therein having a first opening adapted to communicate with the enclosure and a second opening adapted to communicate with the surrounding environment. The housing is made of an alloy, such as the alloy identified as HASTELLOY® C-22®, so as to resist corrosion from the corrosive materials. Within the chamber of the housing is disposed a unitary filter element located between the first and second openings for venting hydrogen gas from the container. The filter element comprises a carbon-to-carbon filter media for providing a hydrogen permeability greater than 10E-06 mol/s/mol/fraction with a removal of 0.45 micron particles exceeding 99.00% at an air flow rate capacity less than 200 ml/min. at a pressure differential less than 1.0 inch water column.

In a further aspect of the invention, the housing of the enclosure has a radially extending flange portion adapted to overlie the outer surface of the enclosure and an axially extending portion adapted to pass through the opening in the container, the axially extending portion including a coupling adapted to attach the housing to the enclosure.

In still a further aspect of the invention, the axially extending portion of the housing includes a support arrangement within the chamber for preventing axial movement of the filter media through the second opening of the housing, the enclosure vent further including a perforated lid attached to the housing for preventing axial movement of the filter media out of the second opening of the housing while allowing passage of hydrogen gas therethrough.

In a still a further aspect of the invention, the flange portion of the housing has a relieved portion which receives the lid in a press fit that permanently retains the lid on the housing.

In still a further aspect of the invention, a gasket is disposed adjacent the flange portion of the housing to seal between the flange portion and the enclosure.

In still another aspect of the invention, the enclosure is in the form of a container such as, but not limited to, a drum or a convenience can.

BRIEF DESCRIPTION OF THE DRAWINGS

FIG. 5 is a chart setting forth comparative aqueous corrosion data for HASTELLOY® C-22@ alloy;

FIG. 6 is a top view of a convenience can having an enclosure vent configured in accordance with the principles of the present invention;

FIG. 7 is a side elevational view of the convenience can of FIG. 5; and

FIG. 8 is a side elevation of the enclosure vent shown in FIGS. 5 and 6 separated from the lid of the convenience can of FIG. 5, and FIG. 9 is an enlarged view showing an edge on the housing biting into the filter media.

DETAILED DESCRIPTION

Figure 2:
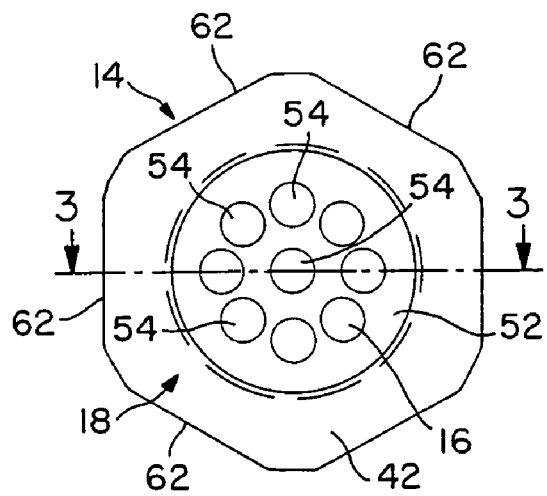
FIG. 2 is an enlarged top view of the enclosure unit of FIG. 1 removed from the drum.
Figure 3:
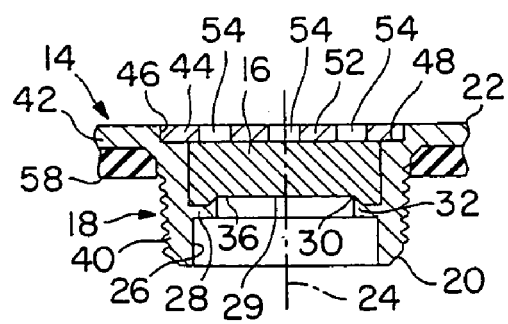
FIG. 3 is an enlarged cross-section taken along lines 3—3 of FIG. 2.
Figure 4:
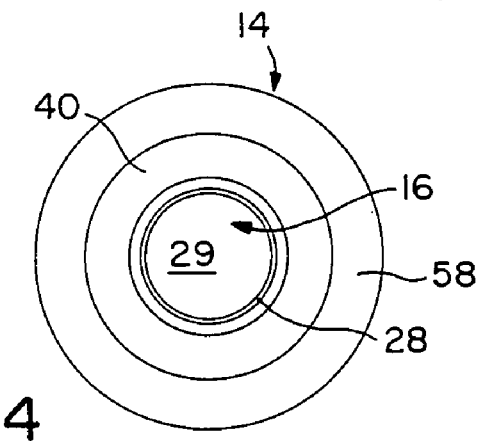
FIG. 4 is an enlarged bottom view of the enclosure vent of FIGS. 1–3.

Referring now to FIGS. 2–4, the filter media 16 is retained within housing 18 which is shown in greater detail and has a first end 20 and a second end 22. The housing 18 is cylindrical about an axis 24 and defines a chamber 26 having a shoulder 28 therein. The filter media 16 is disposed within the chamber 26 and abuts the shoulder 28. The shoulder 28 has a sharp annular edge 30 defined by a slightly conical portion 32 of the shoulder which bites into the bottom surface 29 of the filter element 16 (see FIG. 9) to engage and provide a knife edge seal 36 so that the first end 20 of the housing is sealed with respect to the filter media 16. Consequently, all of the gasses, liquids and solid particles within the drum 10 which pass through the vent 14 must pass through the filter media 16 because there is a carbon-to carbon/nickel, chromium, molybdenum alloy seal between the filter media 16 and housing 18. Accordingly, the filter media 16 is sealed with the housing 18 by direct engagement with the alloy comprising the housing.

A gas, such as hydrogen gas, accumulates in the head space 17, the gas is vented through the filter media 16. In accordance with the principles of the present invention, the filter media 16 is enclosed within a housing 18 which is made of HASTELLOY7C-227 alloy which is a NiCr21Mo14w (Nickel, Chromium, molybdenum) alloy, the significance of which is explained hereinafter.

Referring now to FIGS. 2–4, the filter media 16 is retained within housing 18 which is shown in greater detail and has a first end 20 and a second end 22. The housing 18 is cylindrical about an axis 24 and defines a chamber 26 having a shoulder 28 therein. The filter element 16 is disposed within the chamber 26 and abuts the shoulder 28. The shoulder 28 has a sharp annular edge 30 defined by a slightly conical portion 32 of the shoulder which bites into or penetrates the bottom surface 29 of the filter element 16 to provide a knife edge seal 36 so that the first end 20 of the housing is sealed with respect to the filter element 16. Consequently, all of the gasses, liquids and solid particles within the drum 10 which pass through the vent 14 must pass through the filter element 16.

The housing 18 comprises an externally threaded cylindrical portion 40 and a radial flange portion 42, the radial flange portion having a circular relieved area 44 defined by an inwardly facing annular wall 46. Between the annular wall 46 and the cylindrical chamber 26 is an annular shelf 48. The annular wall 46 and annular shelf 48 cooperate to define the relieved portion 44. Received within the relieved portion 44 is a lid 52 that has a plurality of circular openings 54 therein which in the illustrated embodiment are arranged in a circle with one opening aligned with the axis 24. A disk 52 has a diameter which compliments the diameter of the wall 46 so that when the disk 52 is pressed into the relieved portion 44, there is a very tight interference fit. Consequently, no adhesive is required which might interact with corrosive or otherwise deleterious substances in the vicinity of the enclosure 14. The lid 52 is pressed down to engage against the annular shoulder 48 so as to overlie the filter element 16 and hold the filter element 16 against the penetrating edge 30 on the shoulder 28.

Figure 1:
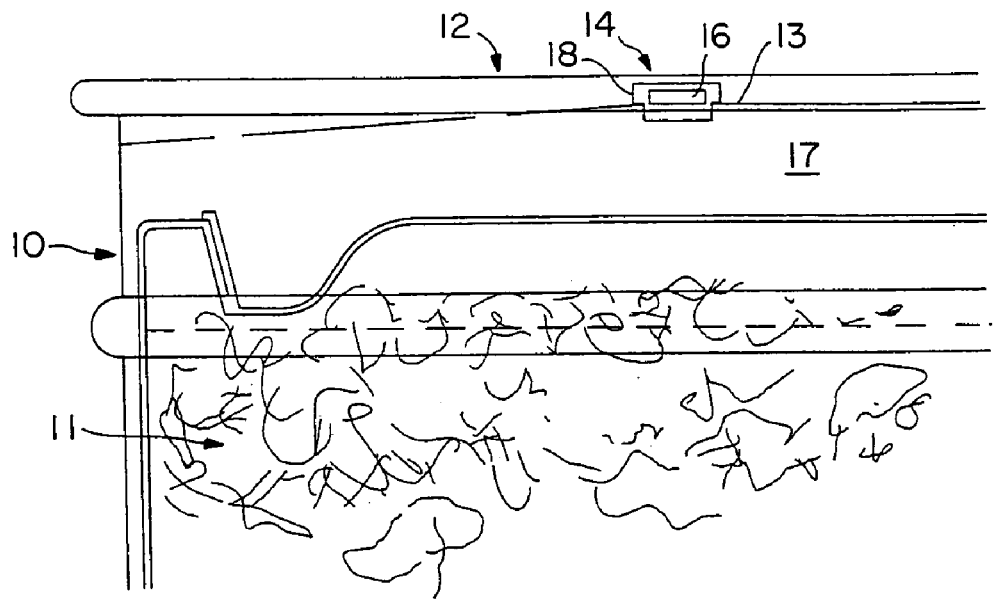
FIG. 1 is side elevation showing an enclosure vent according to the present invention disposed in the lid of a drum.

An annular neoprene gasket 58 is disposed against the back surface 60 of the radial flange portion 42 so as to seal the housing 18 with respect to the outer surface of the drum lid 12 (see FIG. 1). The radially extending flange portion 42 has flat edges 62 so as to provide gripping surfaces for a wrench when the vent insert 14 is threaded into the opening 13 through the lid 12 of the drum 10.

Referring now to FIG. 5, in accordance with the present invention, both the housing 18 and the lid 52 are made of HASTELLOY® C-22® alloy which is a proprietary alloy available from Corrosion Materials Division of Spectrum Metals, Inc., having the present address 2262 Groom Road, Baker. La. 70714. The HASTELLOY® C-22® alloy is resistant to chemical corrosion from chlorinated solvents, strong acids including hydrochloric acid and nitric acid. By having a press fit, adhesives and cements such as RTV need not be employed so that deterioration of adhesives due to exposure to hydrochloric acid is avoided. The expected time to failure of a vent configured in accordance with FIGS. 1–3 or FIGS. 5–7 in a typical hydrochloric acid storage/ventilation application is about 200 years. Failure in such a situation occurs when the vent insert 14 becomes clogged due to corrosion. After 200 years, it is highly unlikely that hydrogen gas generation will be occurring. Accordingly, sealing of drums 10 after 200 years by plugging the vents may quite possibly be advantageous because plugging the vent inserts 14 in effect seals the drums 10.

From the data of FIG. 5, it can be concluded that HASTELLLOY® C-22® has an average corrosion rate no greater than 2 mils per year when immersed in hydrochloric acid at a concentration of 2.0 to 2.5% by weight and a temperature of 90° C.; an average corrosion rate no greater than 2 mil per year when immersed in nitric acid at a concentration of 10% by weight and boiling, an average corrosion rate no greater than 6 mils when immersed in a solution of nitric acid and 15.8% hydrochloric acid at a concentration of 8.8% by weight and a temperature of 52° C.

Moreover, FIG. 5 shows that HASTELLOY® C-22® has an average corrosion rate for hydrochloric acid at a concentration of 2.5% by weight at 90° C. which is less than 1 mil per year; an average corrosion rate for boiling nitric acid at a concentration of 10% which is less than 1 mil per year; and an average corrosion rate for nitric acid plus 15.8% hydrochloric acid in a concentration of 8.8 percent which is no greater than 4 mils per year.

Referring now to FIGS. 6, 7 and 8, an enclosure vent insert 70 is shown for venting a convenience can 72. The convenience can 72 is of the type disclosed in U.S. Pat. No. 5,911,332 issued Jun. 15, 1999 and U.S. Pat. No. 5,727,707 issued Mar. 17, 1998, both of which are incorporated in their entirety by reference. The vent insert 70 differs from the vent insert 14 of the first embodiment set forth in FIGS. 1–3 in that the vent housing 73 has a cylindrical portion 74 which is unthreaded and a radially extending flange portion 76 which is circular rather than diagonal. The vent insert 70 also includes a relieved portion 44' which receives a lid 52' having holes 54' therethrough in a press fit interference relationship so that there is no adhesive required. In addition, the filter element 16' is received in a cylindrical chamber 26' and is seated against a sharp edge 30' on a shoulder 28'. Moreover, both the housing 73 and lid 52' are made of HASTELLOY® C-22@ alloy. Consequently, the filtering, and mounting of the filter element 16' within the housing 73 in cooperation with the lid 52' is substantially similar to that of the vent insert 14 of FIGS. 1–4.

The vent insert 70 is received within a round hole 77 in the lid 78 of the convenience can 72 with the flange portion 76 having a lip 60' that overlies the surface of the lid. In order to secure the vent insert 70 on the lid in sealed relation thereto, a tungsten inert gas weld 80 is formed completely around the periphery of the radially projecting flange portion 44'. While the flange portion 76 is shown as circular, it can be any shape as long as it overlies the top surface of the lid 78.

While the vent inserts 14 and 70 have been shown in combination with a drum 10 in the first embodiment and a canister such as a convenience can 72 in the second embodiment, the vent inserts may be used with any wall of an enclosure requiring venting. For example, one or more of the inserts may be used in a large enclosure, such as a room, or in enclosures of various shapes and sizes being made of various materials.

In all embodiments of the present invention, the vent inserts 14 and 70 both meet WIPP, WAC and SAR Section 1.3.5 requirements i.e.:

$H_2$ permeability exceeds 20 E-6 mol/s/mol fraction;

remove greater than 99.97% removal of 0.5 micron DOP; and provide greater than 200 ml/min. air flow capacity at less than 1.0 inch water column.

The filter element 16 comprises a carbon-to-carbon composite filter media which impedes diffusion of volatile organic compounds, eliminates the need for GAC B Pads TMS7 for drums or costly repackaging operations; resist chloride corrosion, and is 70% porous.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The vent inserts 14 and 70, configured in accordance with the present invention with a carbon-to-carbon filter media 16 in HASTELLOY® C-22® alloy housings 18 and 52, demonstrate chemical resistance through tests in one liter desiccators with about 200 ml of 12 mol (concentrated hydrochloric acid (HCl)). The tests were accelerated tests wherein vapor pressure of 12 molar HCl at room temperature produced a vapor concentration of 100,000 ppm v of HCl. This is compared to the worst case expected of a 3 molar HCl concentration in drums which at room temperature produce a vapor concentration of 30 BP nv of HCl. Thus, this test accelerates by more than 3,000 times the expected corrosion challenge to the vent insert with an integral filter media configured in accordance with the present invention. The test included a 100% immersion of the vent insert in vapor rather than just one side of the insert being in vapor and the other side being in cleaner air. During the test, the HCl concentration was kept constant at 12 molar with the concentration not decreasing over time.

After 38.7 hours, the vent inserts of the present invention were 5% plugged; after 234 hours the vent inserts were 10% plugged, and after 405 hours, the vent inserts were 30% plugged. When plotted to a failure point of 100% plugging, the estimated time to failure at which there is a 100% increase in resistance to flow for a 2 inch water column at a set flow rate of 200 ml/min. or 100 m/min. at a 1 inch water column plugging was estimated to occur at about 600 hours. Under normal conditions, the expected plugging in 75,000 days occurs after 205 years.

COMPARATIVE EXAMPLES

A vent insert having a 316 stainless steel housing with Dvcon epoxy sealant and a carbon composite filter element failed in nitric acid, failed in carbon tetrachloride and failed in 1,1,1 TCE. After 24 hours, the epoxy became gluey. Moreover, after 24 hours, the reaction of the epoxy sealants with solvents continued.

Comparative Example 2

A mechanical press fit seal with a carbon-to-carbon composite filter element disposed in a type 316 stainless steel housing passed compatibility tests with nitric acid, carbon tetrachloride, 1,1,1 TCE with no change in filtration performance. Exposure to nitric acid resulted in a test chamber being filled with NOX fumes with the filter unchanged.

This vent insert failed the HCl compatibility test because the filter media became plugged. Corrosion continued to increase and thicken throughout the exposure to HCl with the corrosion being moist with condensed acid fumes.

Comparative Example 3

The carbon-to-carbon composite filter element 16 which has a carbon content greater than 99% with 0.26% calcium and 0.73% potassium was tested in a 12 molar HCl environment and showed no plugging indicating that the proximity of the stainless steel housing and lid caused plugging of the filter media.

By using the HASTELLOY® housing 18 and lid 52 in combination with the carbon-to-carbon filter element corrosion was minimized so that a 200 year time to failure interval resulted which provides timely acceptable corrosion resistance.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An enclosure vent adapted to vent hydrogen gas while controlling release of volatile organic compounds from an enclosure containing transuranic waste to an environment surrounding the enclosure while being resistant to corrosion from corrosive materials including chlorinated solvents, hydrochloric acid and nitric acid, the enclosure vent comprising:

a housing defining a chamber therein having a first opening adapted to communicate with said enclosure and a second opening adapted to communicate with the surrounding environment, the housing being made of a nickel, chromium, molybdenum alloy having a resistance to corrosion from said corrosive elements for at least 200 years;

a filter media disposed in said chamber between the first and second openings for venting hydrogen gas from the container, the filter media being a carbon-to-carbon filter media for providing a hydrogen permeability greater than 10E-06 mol/S/mol fraction weight, a removal of 0.45 micron particles exceeding 99.00% at an air flow capacity less than 200 ml/min., at a pressure differential less than 1.0 inch, and a seal between the filter media and the housing, the seal consisting of direct engagement between the nickel, chromium, molybdenum alloy of the housing and the carbon-to-carbon filter media.

2. The enclosure vent of claim 1 wherein the housing has a radially extending flange portion adapted to overlie the outer surface of the enclosure and an axially extending portion adapted to pass through the opening in the enclosure, the axially extending portion including a coupling adapted to attach the housing to the enclosure.

3. The enclosure vent of claim 2 wherein the axially extending portion of the housing includes an annular shoulder spaced from the first and second openings thereof within the chamber for preventing axial movement of the filter media through the first opening of the housing and for sealing with the filter media and wherein the enclosure vent further includes a perforated lid having a plurality of openings, the perforated lid being attached to the housing for preventing axial movement of the filter media out of the second opening of the housing while allowing the passage of hydrogen gas therethrough.

4. The enclosure vent of claim 3, wherein the axially extending portion of the housing is cylindrical.

5. The enclosure vent of claim 3, wherein the axially extending portion of the housing is cylindrical and the coupler adapted to attach the housing to the container is a helical thread around the axially extending portion of the housing.

6. The enclosure vent of claim 3, wherein the support arrangement comprises an annular shoulder having a support surface against which the filter media abuts.

7. The enclosure vent of claim 1, wherein the housing includes an axially extending threaded portion and a radially extending flange portion, with the chamber including an annular shoulder therein for supporting and directly sealing with the filter media, the flange portion supporting a perforated lid made of the same alloy as the housing to cover the filter media while the filter media is supported on the annular shoulder.

8. The enclosure vent of claim 7, wherein the flange portion of the housing has a relieved portion around the chamber enclosed by a radially facing axially extending wall that defines a shelf of a selected shape and wherein the lid has a shape complementing the shape of the shelf for having a press fit within the wall to retain the lid in abutment with the shelf to retain the filter media within the chamber.

9. The enclosure vent of claim 8 further including a gasket disposed adjacent the flange portion adapted to seal between the flange portion and the enclosure.

10. The enclosure vent of claim 8 wherein the enclosure is a container having a stainless steel wall and wherein the flange portion of the housing is adapted to be fixed to the lid with a peripheral weld.

11. The enclosure vent of claim 9 wherein the enclosure with which the enclosure vent is adapted to be used is a stainless steel container with a stainless steel lid and wherein the enclosure vent is adapted to be welded to the lid.

12. The enclosure vent of claim 1 wherein the a nickel, chromium, molybdenum alloy of the housing has an average corrosion rate no greater than 2 mils per year when immersed in hydrochloric acid at a concentration of 2.0 to 2.5% by weight and a temperature of 90E; an average corrosion no greater than 2 mil per year when immersed in a solution of nitric acid and 15.8% hydrochloric acid at a concentration of 8.8% by weight and a temperature of 52EC.

13. The enclosure vent of claim 12 wherein the average corrosion rate of the a nickel, chromium, molybdenum for hydrochloric acid is less than 1 mil per year; the average corrosion rate of the alloy for nitric acid is less than 1 mil per year, and the average corrosion rate of the alloy for nitric acid plus 15.8% hydrochloric acid is no greater than 4 mils per year.

14. The enclosure vent of claim 1 wherein the enclosure vent is adapted for use with a stainless steel enclosure.

15. An enclosure vent adapted to vent hydrogen gas while controlling release of volatile organic compounds from an enclosure containing transuranic waste to an environment surrounding the enclosure while being resistant to corrosion from corrosive materials including chlorinated solvents, hydrochloric acid and nitric acid, the enclosure vent comprising:
   a housing defining a chamber therein comprising a first opening adapted to communicate with said enclosure and a second opening adapted to communicate with the surrounding environment, the housing being made of a nickel, chromium, molybdenum alloy having a resistance to corrosion from said corrosive elements for at least 200 years, and
   a unitary filter media disposed in said chamber between the first and second openings for venting hydrogen gas from the container, the filter media comprising a carbon-to-carbon filter for providing a hydrogen permeability greater than 10E-06 mol/S/mol fraction weight, a removal of 0.45 micron particles exceeding 99.00% at an air flow capacity less than 200 ml/min., at a pressure differential less than 1.0 inch, the unitary filter media being sealed with the housing by direct engagement with an annular edge on the housing which engages a bottom surface of the filter media to provide a carbon-to-carbon/nickel, chromium, molybdenum alloy knife edge seal between the filter media and housing.

16. The enclosure vent of claim 15 wherein the enclosure vent includes a perforated lid covering the filter media which is fixed over the chamber by direct contact with the housing.

17. The enclosure vent of claim 16 wherein the direct contact is a press fit between the lid and housing.

18. The enclosure vent of claim 16 wherein the direct contact is a weld.

19. The enclosure vent of claim 15 wherein the enclosure vent is adapted for use with a stainless steel enclosure.

* * * * *

UNITED STATES PATENT AND TRADEMARK OFFICE
CERTIFICATE OF CORRECTION

PATENT NO. : 7,048,139 B1  
APPLICATION NO. : 09/658374  
DATED : May 23, 2006  
INVENTOR(S) : Peterson et al.

Page 1 of 1

It is certified that error appears in the above-identified patent and that said Letters Patent is hereby corrected as shown below:

Column 7, line 44, delete "a".  
Column 7, line 48, change "90E" to --90C--.  
Column 7, line 49, change "mil" to --mils--.  
Column 8, line 2, change "EC" to --C--.  
Column 8, line 4, delete "a".

Signed and Sealed this

Second Day of January, 2007

JON W. DUDAS  
*Director of the United States Patent and Trademark Office*